United States Patent [19]
Wallace

[11] 3,847,788
[45] Nov. 12, 1974

[54] ELECTROGEL APPARATUS FOR REMOVING ELECTROLYTES AND CONCENTRATING THE SAME FROM AN AQUEOUS SOLUTION

[76] Inventor: Richard A. Wallace, 43 Kingscote Gardens, Brooklyn, N.Y. 94305

[22] Filed: Dec. 13, 1972

[21] Appl. No.: 314,849

Related U.S. Application Data

[62] Division of Ser. No. 23,311, March 27, 1970, Pat. No. 3,718,559.

[52] U.S. Cl............ 204/301, 204/180 P, 204/180 G
[51] Int. Cl............................................ B01d 13/02
[58] Field of Search.... 204/299, 180 G, 301, 180 P; 136/86

[56] References Cited
UNITED STATES PATENTS

| | | | |
|---|---|---|---|
| 3,255,100 | 6/1966 | Raymond..................... | 204/180 G |
| 3,276,910 | 10/1966 | Grasselli et al................. | 136/86 |
| 3,364,077 | 1/1968 | Arrance et al.................. | 136/146 |
| 3,462,314 | 8/1969 | Berger et al................... | 136/86 X |
| 3,720,593 | 3/1973 | Juhos............................ | 204/180 G |

Primary Examiner—John H. Mack
Assistant Examiner—A. C. Prescott
Attorney, Agent, or Firm—Charles J. Speciale, Esq.

[57] ABSTRACT

An electrolytic continuous method for simultaneously removing electrolytes from aqueous solution and concentrating the electrolytes produced therefrom which comprises subjecting an aqueous electrolyte solution to contact with an inorganic oxide gel under the influence of an electrical field, allowing the electrolyte to be sorbed by the gel until a point of saturation is achieved, whereby the electrolyte is exuded from said gel and then recovering the resultant electrolyte exudate from said gel. Conveniently, the apparatus comprises at least one electrolyte concentrating unit comprising an inorganic oxide gel core encased within an open module having a bottom wall and a pair of parallel opposing sides and opposing end walls and whose opposing sides further comprise a cation-permeable membrane and an anion-permeable membrane, respectively, and a source of an applied eleectrical field.

7 Claims, 8 Drawing Figures

FIG. 5

RUN I

FIG. 6

RUN I

FIG. 7

RUN II

FIG. 8

RUN II

ELECTROGEL APPARATUS FOR REMOVING ELECTROLYTES AND CONCENTRATING THE SAME FROM AN AQUEOUS SOLUTION

This is a division, of application Ser. No. 23,311, filed Mar. 27, 1970, now U.S. Pat. No. 3,718,559.

BACKGROUND OF THE INVENTION

1. Field of the Invention

This invention relates to an electrolytic method for removing electrolytes from aqueous solutions containing them and to concentrating the electrolytes produced thereby.

2. Description of the Prior Art

Demineralization of water by electrodialysis and electrosorption and desorption processes is of course well known. Electrodialysis, the use of electrical potentials to trap concentrated brine between membranes composed of ion exchange materials is widely known. It is also known to be a complicated procedure and also a very uneconomical one. It involves the use of anion exchange resin membranes and cation exchange resin membranes, each of which will be permeable to ions bearing a given charge, but not to ions bearing the opposite charge. Thus membranes that are permeable to anions are marked with a positive charge, while those that are permeable only to cations are marked with a negative charge. However, not only are these membranes quite expensive, costing about $12.00 per square foot, but they are also subject to problems of scaling and fouling, so that they must be constantly, either cleaned or replaced. Desalination by electrosorption and desorption suffers from the same problems in that the base films coated with condensation-type ion exchange resins act in a manner similar to the cation exchange and anion exchange resin membranes described immediately above.

It would therefore be a tremendous advantage if an economical and uncomplicated process could be found for removing electrolytes from aqueous solutions containing the same.

SUMMARY OF THE INVENTION

In accordance with the invention, there has now been discovered an electrolytic method for simultaneously substantially removing electrolytes from aqueous solutions containing the same, and concentrating the electrolytes produced thereby which comprises subjecting an aqueous solution containing the electrolytes to contact with an inorganic oxide gel under the influence of an electrical field, allowing the electrolyte to be sorbed by said gel until a point of saturation is achieved, whence the electrolyte is exuded by the gel, by a phenomenon known as syneresis, and then recovering the resultant electrolyte exudate as overflow from said gel.

The apparatus for simultaneously removing and concentrating electrolytes from an aqueous solution containing the same comprises at least one electrolyte concentrating unit which further comprises an inorganic oxide gel core encased within an open module having a bottom wall and a pair of parallel opposing sides and opposing end walls, said opposing sides further comprising a cation-permeable membrane and an anion-permeable membrane, respectively, and a source of an appliable electrical field.

While the apparatus and method broadly encompasses within its scope, the simultaneous removal and concentration of electrolytes from aqueous solutions containing the same, it has been found that this apparatus and method are particularly suitable, for example, for desalinating brine solution, such as in sea water and brackish waters, and concentrating the brine exudate produced therefrom, for removing excess citric acid from tart orange and grapefruit uice and concentrating the citric acid exudate, for removing and concentrating radioactive electrolytes from waste aqueous streams, and for removing excess sulfuric acid and other electrolytes, such as ferric salts, from acid mine drainage streams of low pH and high hardness, and simultaneously to concentrate the waste sulfuric acid effluent and other electrolytes to a point where it is readily disposable and still regenerate the original water for further usage. Brine desalination is of particular importance to areas where either fresh water is in short supply, or, where salt is the desired end product. The sweetening of citric juices is of course of particular importance to that industry whereby no added sugar is necessary. Removal of radioactive electrolytes is of considerable advantage today where pollution is a problem, and the removal of sulfuric acid and other electrolytes from mine drainage streams is equally important to present day pollution problems. Another area of importance is in the recovery of concentrated sulfites from spent pulping liquors in the paper industry and, it has been found that the present apparatus is quite useful in this application. The present apparatus and method are also particularly suitable for the removal and concentration of zinc salts from acidic aqueous electrolytes. This is of particular interest in the leather tanning industry.

BRIEF DESCRIPTION OF THE DRAWINGS

The invention will be more fully understood with reference to the accompanying drawings in which.

DESCRIPTION OF THE SPECIFIC EMBODIMENTS

Figures 1, 2, 3:
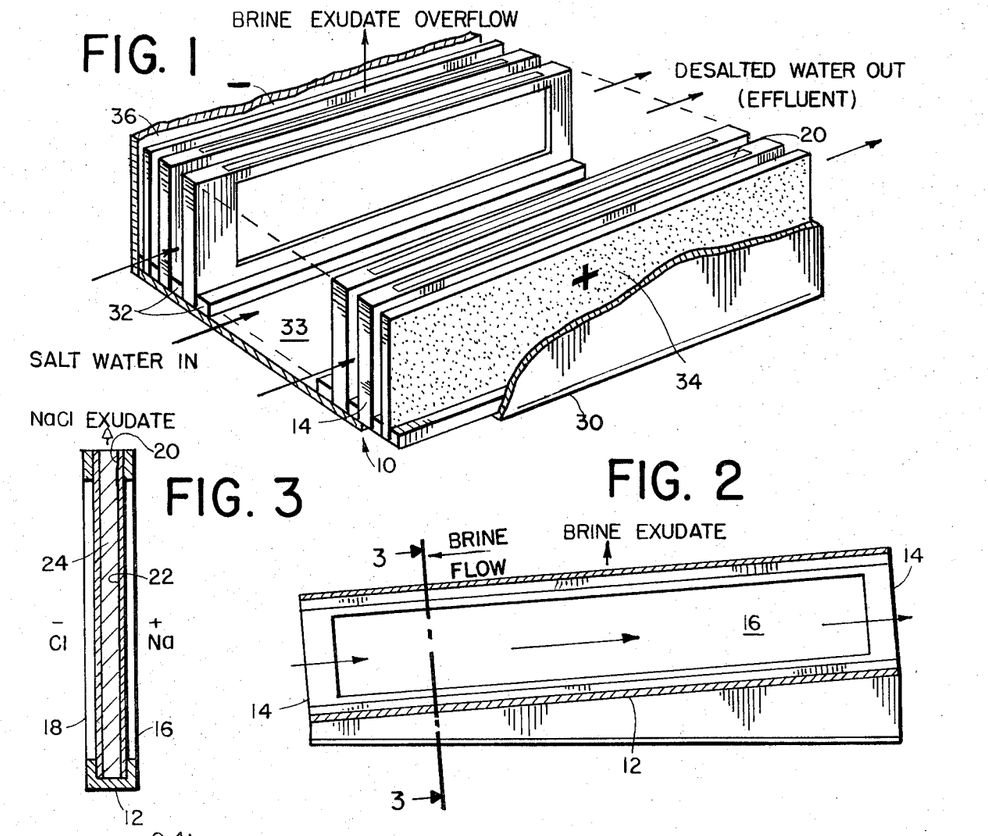
FIG. 1 is a fragmented view in perspective showing a plurality of the invention gel modules interspersed between a source of an electrical field comprising a positive and negative electrode.
FIG. 2 is a side elevational view of one of the modules of the invention and as shown at a slight incline to the norm.
FIG. 3 is a sectional view taken along line 2—2 of FIG. 2 in the direction of the arrows.

Referring now to the figures of the drawings, each invention module 10 comprises an elongated body having a bottom wall 12, a pair of parallel opposing end walls 14 and a pair of parallel opposing sides 16 and 18, respectively. Opposing side 16 further comprises a cation-permeable membrane which will be more fully described hereinbelow, and opposing side 18 further comprises an anion-permeable membrane which will be similarly described. The resulting module 10 is open at the top as at 20 and there is defined between the opposing sides 16 and 18 and opposing end walls 14, an elongated channel 22. Into this channel is placed an initially liquid inorganic oxide gel 24, whose composition will be described subsequently. Thus, a battery of these modules 10 can be placed in compartmented fashion within a frame 30 containing suitable elongated tracks 32 along the inside bottom 33 thereof into which each module is slidingly inserted. In turn, this battery of modules is interspersed between a source of an electrical field supplied by a graphite anode 34 and a stainless steel cathode 36. Each module may be constructed of any suitable rigid material, such as plastic, e.g., plexiglass, or the like. Preferably, for a reason that will become readily apparent, the modules, when in use, are inclined either longitudinally at a slope from the normal, or tansversely, at a slope from the normal.

The inorganic oxide gel core is formed of a suitable polymerizable compound. The requirements of a suitable inorganic oxide gel coming within the scope of the invention have been found to be as follows:

1. The gel must be non-elastic and essentially non-swelling.
2. The gel must have high electrical conductivity and salt diffusivity in the presence of electrolytic solutions.
3. The gel must readily undergo syneresis under its own gel weight.
4. The gel must substantially undergo the process of imbibition and exudation of electrolytic solutions over periods of months without attendant gel breakdown.
5. The gel must be hard and stable over several months in electrolytic solutions.
6. The gel must be compatible with the ion permeable membranes.

It has been found that such gels fall within elements in the Periodic Table coming from the Groups III-A, IV-A, IV-B, V-B, VI-B, VII-B, VIII and rare earths. As illustrative of such inorganic oxide gels may be listed: silicic acid; vanadium pentoxide; manganese dioxide; cerric hydroxide; oxide; zirconium hydroxide, molybdate, borate; ferric phosphate, arsenate, borate; chromium phosphate, arsenate, borate; and stannic hydroxide, borate, and tungstate.

The inorganic oxide gel employed may also consist of a plural gel comprising a predominant amount of silica with one or more metals or oxides thereof selected from Groups I-B, II, III, IV, V, VI, VII and VIII of the Periodic Table.

Particular preference may be given to plural gels of silica with metal oxides of Groups II-A, III and IV-A, especially wherein the metal oxide is magnesia, rare earth, titania, beryllia, thoria, or combinations thereof.

The preparation of plural gels is well known and generally involves either separate precipitation or coprecipitation techniques in which a suitable solid of the metal oxide is added to an alkali metal silicate, and an acid or base, as required, is added to precipitate the corresponding oxide. The silica content of the siliceous gel matrix contemplated herein is generally in the range of 55 to 100 weight percent with the metal oxide content ranging from 0 to 45 weight percent. In a preferred mode of operation, silica gel is employed as the core material for the module. Silica gel is a solid resulting from the reaction of sulfuric acid and sodium silicate as may be represented by the following formula:

This reaction mixture is poured into the elongated channel of the module as defined hereinabove and solidification of the polymer is brought about when the polysilicate acid is formed from the reaction. The rate at which polymerization takes place depends on the proportion of sulfuric acid to sodium silicate and the concentrations of these reactants. This is well known to the art. The greater the percentage of sodium silicate in the reaction mixture and more concentrated the acid and silicate are, the faster the gel will set and the more solid it will become. In typical gel formation 40 ml. of 6 molar silicate solution when mixted with 15 ml. of 10 molar sulfuric acid, which mixture is allowed to stand for about 10 minutes when poured into the gel compartment and allowed to polymerize, will yield a hard gel solid. Over-night hardening of the gel is highly desirable. Before use, the hardened gel is leached of excess acid electrically for about 12 hours by reversing the field polarities so that the electrolytes in the gel structure are removed from the gel and discharged into the surrounding solution. This will become more readily apparent subsequently.

The operation of the invention apparatus will now be described in greater detail. While it is to be understood that the invention apparatus and method are applicable in removing and concentrating any electrolyte from aqueous solutions, for ease of description, the method will be described in terms of desalinating a brine solution and concentration of the brine produced therefrom.

As mentioned, polymerized silica gel is sandwiched between a cation-permeable and anion-permeable membrane. Brine solution to be desalted flows on both sides of the membrane-gel module. Application of an electric field causes the ions to move towards the electrodes of opposite sign. Thus $Na^+$ ions enter from the left side through the cation-permeable layer and into the gel. Since the anion-permeable membrane allows only negative ions to pass through, the passage of $Na^+$ ions out of the gel is prevented. Similarly $Cl^-$ ions are transferred from right to left into the gel compartment. In this way, the feed solution is depleted of NaCl while the gel salt concentration builds up in the gel.

Together with the transport of ions, a concomitant phenomenon of electro osmosis occurs. The ions drag along water molecules into the gel. In addition, osmosis causes extra flow of water in the same direction. The gel can maintain a high percentage of concentrated salt solution. However, once its capacity is exceeded, it rejects the solution. Since the gel is bounded on both sides by the membranes, the flow of solution occurs upwards to the open face of the gel module at the top. At steady state conditions, the overflow rate becomes constant and equal to the net solution flow. Also, the amount of salt in the overflow will be equal to the amount of salt removed from the feed solution which in turn is related to the current flowing through the system.

As illustrated in FIG. 1, an electrogel demineralizer is composed of many gel modules arranged between a pair of electrodes in a manner that allows the brine solution to be demineralized, i.e., desalted, to flow between the parallel surfaces of the gel modules. When voltage is applied to the electrodes, cations go from the solution through the cation-permeable layers into the inner gel layer but are blocked from going further by the anion-permeable layer. Simultaneously, the anions are transported in the opposite direction through he anion-permeable surface into the gel core, but are blocked in turn from going through the modules by the cation-permeable layer. Thus, electrolyte (NaCl) is trapped inside the gel and the external solution is desalted as it flows through the spaces of the gel module. As this operation continues, the solution in the gel becomes concentrated with electrolyte. The gel then undergoes appreciable shrinkage in volume with a simultaneous exudation of concentrated brine. The gel phenomenon is called syneresis.

Silicic acid gel has an ability to distribute salt between itself and the external salt solution, the rate of salt concentration varying greatly with different ions. The diffusivity and conductivity in the silica acid gel is high so that, as a result, there is negligible electrical resistance and polarization at the gel interfaces.

Using this apparatus and method as high as 20 times desalination over the brine feed can be achieved. The volume of gel brine overflow is linear with the quantity of electrical energy (Faradays) used, except initially during the start of each run. It has been found that the gel, e.g., silicic acid, vanadium pentoxide, etc. maintains very high levels of salt up to about 4.5 N sodium chloride and 3.5 N potassium chloride.

The cation-permeable and anion-permeable membranes may be any commercially available membrane, some of which will be described in the examples immediately below. Alternatively, instead of one of the commerically available anion-permeable membranes, a neutral or slightly or moderately anionic anion-permeable membrane film, such as cellulose or loosely structured films of moderate anionic properties, may be employed. These latter membranes are characterized by slightly lower salt diffusion rates and electrical conductivities relative to conventional anion exchange membranes. Thus, if it is the purpose of the operation to concentrate brine, then the commercially available anion-exchange membrane will be used, whereas, if it is desirous to desalinate brackish solution, then the neutral or moderately anionic permeable membrane will be employed, so that much higher current densities can be obtained. A typical ion-permeable membrane employed in the invention will have the following specifications:

1. Electrical resistance in 0.01 N NaCl: less than 15 ohm-cm$^2$.
2. Anion-transference number: $\bar{t}_-$, as calculated from concentration potential measurements between 0.010 and 0.005 N NaCl: 0.65 to 0.85.
3. Cation-transference number: $\bar{t}_+$, as calculated from concentration potential measurements between 0.010 and 0.005 N NaCl: 0.75 to 0.98.
4. Salt diffusion measured between 0.1 N NaCl and distilled water: $10^{-5}$ to $10^{-4}$ gram equivalent/cm$^2$-hr.
5. Acid diffusion measured between 0.002 N H$_2$SO$_4$ and distilled water: $10^{-6}$ to $10^{-5}$ gram equivalent/cm$^2$-hr.
6. Burst strength by standard Mullen Burst tester: greater than 30 psi.
7. Water-permeability: less than $10^{-5}$ ml/sec-cm$^2$-psi.
8. Electroosmotic water transport: less than 13 moles per Faraday.

Thus, electrogel desalination, in accordance with the invention, is a continuous process in which ions acting under the force of applied electrical field are transported and concentrated in gel modules. At the same time, the gel rejects this concentrated salt as brine overflow at the top of the gel. It will now be readily apparent why it is highly desirable to tilt the gel module, i.e., at a slope deviated from the normal, either longitudinally or transversely, and that is to allow for greater ease of brine overflow and concentration. Any brine overflow will flow down the slope to its collection chamber.

The advantages of the invention electrogel desalinator with respect to conventional electrolytic processes are manifold. Among these may be included:

1. More economical and simpler stack construction than related electrodialysis and electrosorption desalting processes.
2. Produces a high concentration of brine (ratio of brine concentration to feed concentration may range from about 6:1 to 20:1).
3. Eliminates one process stream thereby lowering storage, pumping and piping requirements.
4. Treats feed that are high in CaSO$_4$ with little difficulty.
5. Process is continuous and requires no regeneration.
6. Higher gel-membrane area utilization.

This invention will be further illustrated in conjunction with the following specific experimental runs which will serve as Examples of the invention. All of the ion-permeable membranes employed hereinbelow will be understood to meet all the required specifications as set forth earlier, whether mentioned specifically, or not. While the present invention has been described in terms of preferably a continuous method of operation for simultaneously removing and concentrating electrolytes from aqueous solutions containing the same, it is to be understood that the method may also be practiced in a batch-wise operation.

RUN I (CONCENTRATED FEED)

Figure 4:
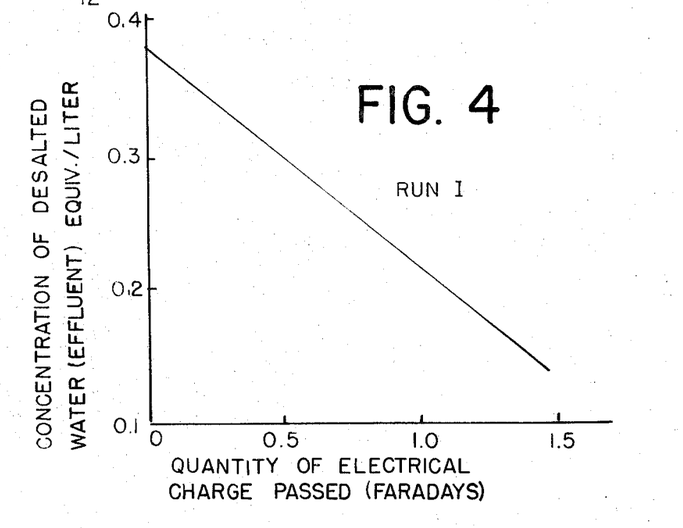
FIGS. 4 to 8 are plots of results achieved in accordance with the method of the invention.
Figure 5:
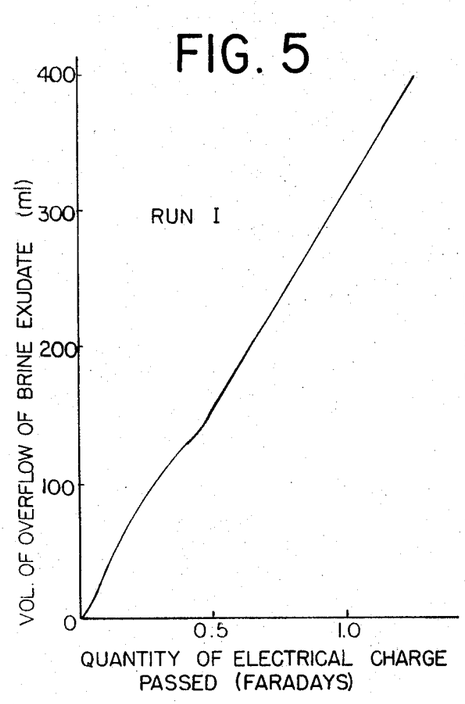
Figure 6:
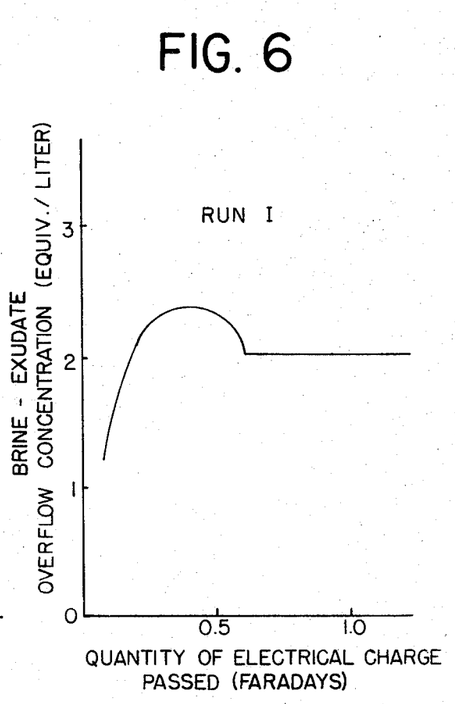

The results of this run are presented in FIGS. 4 to 6. The effluent concentration, brine-exudate gel overflow volume, and overflow concentration are all plotted against the quantity of electrical energy passed through the gel desalination set-up. A silicic acid gel module was used. The cation-permeable membrane was an Ionics Nepton CR-61 cation-exchange heterogeneous membrane consisting of sulfonated vinyl-divinyl benzene copolymer with Dynel fabric backing. This membrane has an ion-exchange capacity of 2.7 meg./gram and a water transport of 11 moles water per Faraday. The anion-permeable membrane was an Ionics Nepton AR-IIIA anion-exchange heterogeneous membrane consisting of quaternary ammonium basic groups on a vinyl-divinyl benzene base with dynel backing. This membrane has an ion-exchange capacity of 1.8 meg./gram and a water transport of 6 moles water per Faraday.

$Q = I \times \theta = 112,840$ coulombs
$= 112,840/96,500$
$= 1.17$ Faradays

For each Faraday passed, theoretically one equivalent of salt goes into the gel compartment and another equivalent of salt goes into the electrode compartment. Hence, Theoretical Salt Removed $= 2 \times Q$
$= 2 \times 1.17$
$= 2.34$ equivalents Now the actual salt removed is the difference in the salt in the feed and the salt in the effluent.

Initial Salt in Feed $= 0.38 \times 10 = 3.8$ equivalent
Final Salt in Effluent $= 1.74$ equivalent
Actual Salt Removed $= 2.10$ equivalent
Overall Current Efficiency = Actual Salt Removed $\times$ 100/Theoretical Salt Removed
$= 2.10/2.34 \times 100$
$= 90$ percent Current Density
Initial Current Density, $I_i/A = 100$ ma/5 cm$^2$ = 20 ma/cm$^2$
Final Current Density, $I_f/A = 80$ ma/5 cm$^2$ = 16 ma/cm$^2$ Cell Resistance
Initial Resistance, $R_i = E_i/I_i = 9.6$ volts/$100 \times 10^{-3}$ amp
$= 96 \Omega$
Final Resistance, $R_f = E_f/I_f = 9.8$ volts/$80 \times 10^{-3}$ amp
$= 123 \Omega$ Electro Osmotic and Osmotic Flow Rate
From the straight line portion of the brine-exudate overflow volume vs. Quantity of Faradays plot in FIG. 5, at
$Q = 1$ Faraday
$V_o = 314$ cc.
$W = 314$ cc/1 Faraday $= 314$ cc/F
$= 314/18 = 17.4$ moles of $H_2O$/Faraday Desalination Ratio
The desalination ratio is obtained from the overall Brine concentration and the effluent product concentration:
Final Desalination Ratio $= N_o/N_E$
$= 2N/0.2N$
$= 10$

The concentration ratio is obtained from the brine overflow concentration and the feed concentration:
Final Concentration Ratio $= N_o/N_f$
$= 2.0N/0.38 N$
$= 5.3$ See FIGS. 4, 5 and 6.

Again, the effluent concentration, brine-exudate gel overflow volume and concentration are plotted against the quantity of electrical energy in Faradays passed through the electrogel system.

RUN II (DILUTE SALT FEED)

Figure 7:
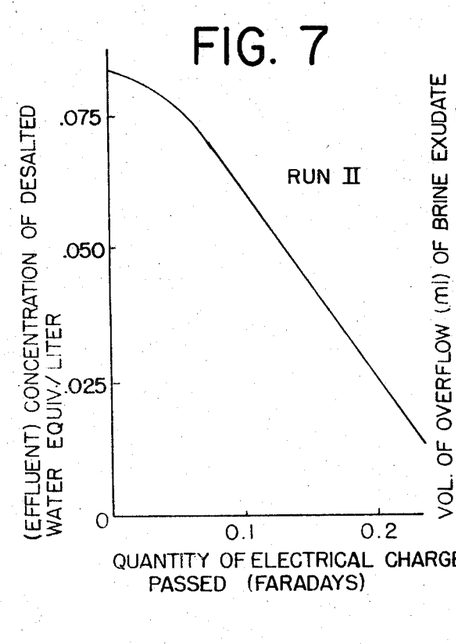
Figure 8:
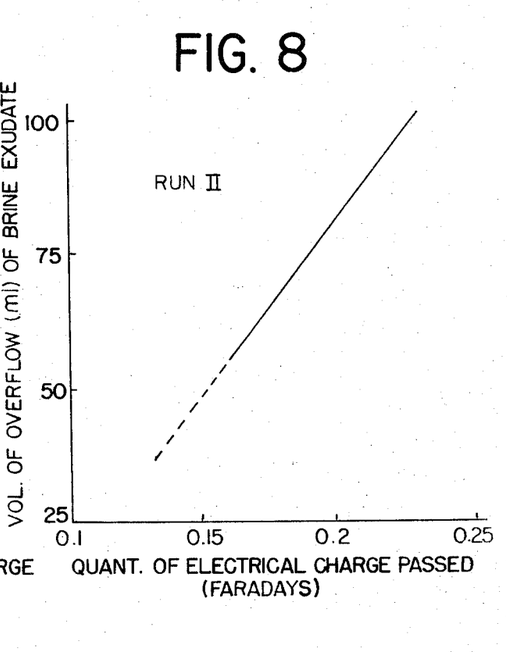

The results of Run II are shown in FIGS. 7 and 8. The Ionics Nepton CR-61 cation-exchange membrane and the Ionics Nepton AR-IIIA anion-exchange membrane were used as the outer films in the silicic acid gel module.

$Q = I \times \theta = 21,720$ coulombs
$= 21,720/96,500 = 0.225$ Faradays
Overall Current Efficiency = Actual Salt Removed/Theoretical Salt Removed
$= 85$ percent
Operative Current Density For Run II $= 16$ mA/cm$^2$ Desalination Ratios
Final Desalination Ratios $= N_o/N_E$
$= 1.6 N/0.010 N$
$= 160$
Final Salt Concentration $= N_o/N_f$
$= 1.6 N/0.082 = 19.5$.
Thus, feed water was concentrated 19.5 times.
See FIGS. 7 and 8.

Interpretation of FIGS. 4–8

FIGS. 4 (Run I) and 7 (RUN II) giving the effluent salt concentration versus quantity of electrical energy Q (Faradays) passed through the system were both approximately linear. This means the overall current efficiency of the electrogel process was fairly constant with feed concentration. The calculated efficiency were 90 percent and 85 percent for the concentrated 0.38 N NaCl and dilute 0.082 N NaCl feed respectively. These coulombic efficiencies were about the same as that of bench-scale electrodialysis. As expected, the efficiency for the dilute salt feed solution was lower than that of concentrated feed because of somewhat higher electroosmosis and osmosis.

In FIG. 5 (Run I) and 8 (Run II), the volume of brine-exudate overflow was linear with the quantity of electrical energy Q (Faradays) passed through the system, except during the unsteady-state period at the start of each run. For the concentrated feed in Run I, a water flow rate of 17.5 moles of $H_2O$ per Faraday is obtained at an average current density of 18 ma/cm$^2$. At this level of current density, the electroosmotic flow rate seems reasonable.

These two runs clearly show that the gel is able to maintain and exude a high concentration of brine product. As FIG. 6 (Run I) shows, after an initial unsteady-state period, the brine-exudate overflow concentration becomes constant at 2.0 N NaCl for the concentrated 0.38 N NaCl feed of Run I and 1.6 N NaCl for the dilute 0.082 N NaCl feed of Run II. Hence, decreasing the feed salt concentration by 78 percent, only lowers the brine-exudate gel overflow concentration by about 20 percent.

The prior art electrodialysis method must operate at low current densities (below 20 mA/cm$^2$) especially when treating high-hardness brackish waters or pH-sensitive solutions because of excessive polarization and scaling of the troublesome anion-permeable membrane.

The present electrogel method, however, can treat these brackish waters at very high current densities (above 40 mA/cm$^2$), providing an anion-permeable film or a membrane with slight or moderate anionic properties is used. The electrogel process has the unique advantage of producing a highly concentrated electrolyte or brine product simultaneously.

RUN III (SILICIC ACID GEL)

A clear and very hard gel was made by reacting one part of concentrated sulfuric acid (H$_2$SO$_4$), specific gravity 1.8 to 4 parts of sodium silicate (Na$_2$SiO$_3$). This viscous mixture solidified in about 15 minutes after being poured in the gel module.

An Ionac fabric-reinforced MC-3235 cation-exchange heterogeneous membrane and and an Ionac fabric-reinforced MA-3236 anion-exchange heterogeneous membrane were used as the outer layers of the 1:4 silicate gel in Run III.

The Ionac fabric-reinforced MC-3235 cation-permeable heterogeneous membrane has an ion-exchange capacity of 1.26 meg./gram and consists of sulfonated copolymers of styrene and divinyl benzene.

The Ionac fabric-reinforced MA-3236 anion-permeable heterogeneous membrane has an ion-exchange capacity of 0.77 meg./gram and consists of aminated copolymers of styrene and divinyl benzene.

Desalination Ratios
Final Desalination Ratio = $N_o/N_E$ = 1.9N/0.025 N = 76
Final Salt Concentration = $N_o/N_f$ = 1.9N/0.20 N = 9.5

RUN IV (MIXED FEED = NaCl – CaSO$_4$ 0.10N 0.05N SOLUTION

A 1:4 moles H$_2$SO$_4$ – Na$_2$SiO$_3$ silicic gel was used along with Asahi Glass Company's Selemion CSH strongly acid membrane and Selemion ASG basic membrane.

The Asahi Glass Company's Selemion CSH strongly acidic membrane is selective only for univalent cations. This membrane is a laminate of a regular cation-exchange membrane with a crosslinked phenolic coating pointed on the membrane surface. This tight coating allows monovalent cations through but stops divalent cations such as calcium and magnesium ions.

The Asahi Glass Company's Selemion ASG strongly basic membrane is selective only for univalent anions. Also, this membrane is a laminate of a regular anion-exchange membrane with a crosslinked aminated coating pointed on the membrane surface. This tight coating allows monovalent anions through but stop divalent anions such as sulfate anions.

Overall Current Efficiency = 82 percent
Operative current density for Run IV = 12 mA/cm$^2$ Desalination Ratios
Final Desalination Ratio = $N_o/N_E$
= 1.40/0.02
= 70
Final Salt (NaCl in the presence of CaSO$_4$ in feed) Concentration = $N_o/N_f$
= 1.40/0.10
= 14 *

* using univalent-permeable Selemion membranes that block transport of divalent calcium and sulfate ions.

RUN V (GEL MODULE USING SLIGHTLY ANION-PERMEABLE [LOOSELY STRUCTURAL] MEMBRANE

Silicic Gel: 1:4 molar ratio of H$_2$SO$_4$ – Na$_2$SiO$_3$
Membranes Used: Ionics Nepton CR-61 cation-exchange membrane and slightly anionic or modified neutral Ionac Chemical Company's membrane (used now in the transport-depletion electrodialytic process). The membrane used had the properties: 75 percent anion permselectivity, 20 percent gel water content, minimum crosslinking, and high salt-diffusion rates of 1.4 × 10$^5$ (gram equivalent) cm$^2$ hr.

Desalination Ratios
Final Desalination Ratio = $N_o/N_e$ = 3.0/0.46 = 6.5
Final Salt Concentration = $N_o/N_f$ = 3.0/0.60 = 5.0

RUN VI

This Run was substantially similar to Run II with the exception that the anion-exchange membrane was replaced by a nonselective plastic membrane film and the silicic gel was a 1:4 ($H_2SO_4$ – $Na_2SiO_3$) molar ratio.

Overall Current Efficiency = 48%
Operative Current Density = 55–60 $\frac{mA}{cm^2}$ for Run VI

Desalination Ratios
Final Desalination Ratio = $N_o/N_E$ = 1.0/0.09 = 11
Final Salt Concentration = $N_o/N_f$ = 1.0/0.2 = 5

RUN VII

This Run was substantially similar to Run VI with the exception that the gel was vanadium pentoxide gel and the anion-exchange membrane was Ionics Nepton AR-111A.

Ionics Nepton membranes have been described previously.

Vanadium pentoxide gel - a solution of 6 N hydrochloric acid was added to 4 N ammonium vanadate yielding vanadic acid gel. The gel concentration was 4.5 grams of $V_2O_5$ per liter. The red-brown gel was observed to be stable and to synerize more the greater concentration of potassium chloride, the gel-coagulating electrolyte.

Overall Current Efficiency = 80%
Operative Current Density = 15 $\frac{mA}{cm^2}$ for Run VII

Desalination Ratios
Final Desalination Ratio = $N_o/N_E$ = 1.4/0.02 = 70
Final Salt Concentration = $N_o/N_f$ = 1.4/0.08 = 17

RUN VIII

This Run was substantially similar to that of Run VI with the exception that the gel was ferric arsenate gel.

The outer layers of the gel module are Ionics membranes described in previous runs.

The sol of ferric arsenate was obtained by adding potassium arsenate solution to a ferric chloride solution. Five milliliters of the sol were mixed with 0.5 Normal potassium sulfate to form a stable gel in the module. The sol content was 31 grams of ferric arsenate per liter.

Overall Current Efficiency = 80%

Desalination Ratios
Final Desalination Ratio = $N_o/N_E$ = 1.3/0.03 = 43
Final Salt Concentration = $N_o/N_f$ = 1.3/0.10 = 13

RUN IX

This Run was substantially similar to that of Run VI with the exception that the gel was zirconium borate gel.

Gel Preparation
The zirconium borate sol was prepared by mixing a solution of zirconium nitrate and a concentrate borate solution. The zirconium borate content was about 15 grams per liter. The gel was formed on adding a 0.4 Normal solution of potassium sulfate. The gel readily synerized and was quite stable in potassium sulfate salt solution.

Overall Current Efficiency = 76%
Operative Current Density = 14 $\frac{mA}{cm^2}$ for Run IX

Desalination Ratios
Final Desalination Ratio = $N_o/N_E$ = 1.8/0.18 = 10
Final Salt Concentration = $N_o/N_f$ = 1.8/0.30 = 6

RUN X

This Run was substantially similar to that of Run VI with the exception that the gel was ferric phosphate gel.

Ferric phosphate gel - the sol of ferric phosphate was prepared by adding potassium phosphate to 3 N ferric chloride solution in slight excess and electrodialyzing the sol mixture for 24 hours. The ferric phosphate sol content was 54 grams per liter and was coagulated by 0.5 Normal potassium sulfate solution. The ferric phosphate gel readily synerized in the presence of potassium sulfate solutions.

Overall Current Efficiency = 80%

Operative Current Density = 18 $\frac{mA}{cm^2}$ for Run X

Desalination Ratios
  Final Desalination Ratio = $N_o/N_E$ = 1.0/0.12 = 8.5
  Final Salt Concentration = $N_o/N_f$ = 1.0/0.20 = 5.0

Sweetening of Citrus Juices (Deacidification)

A problem in the citrus industry exists. Each year a large portion of the orange and grapefruit crop yeilds a juice that is too tart in flavor for full customer acceptance. This tartness can be reduced satisfactorily by the removal of excess citric acid. Currently, this problem is handled in one of two ways: by blending the tart juice with sweeter juice that has been produced at a different time in the growing season; or, by the addition of sugar to the tart juice. Both of these alternatives create problems of their own. In the first case, there are problems of juice storage and juice availability. In the second case, the addition of sugar creates a departure from the pure, unadulterated citrus juice. A third alternative method was proposed for the reduction of acid from fruit juices by an ion-exchange resin column. This method applied the electrodialysis process in the reduction or removal of excess citric acid from tart fruit juices. It comprised an all-anion membrane electrodialysis stack. In this scheme, citrate ions in the juice move through the anion membranes towards the anode into alternating potassium hydroxide cells. Equivalent quantities of hydroxyl ions move from the potassium hydroxide cells into the juice cells to neutralize the hydrogen ions. The net result is the removal of excess citric acid.

This invention provides a much simpler (in mechanical design) and the more economical electrogel method for "sweetening" tart fruit juices. The heart of this process, as described above, is the gel module consisting of commercial cation-permeable membrane on one opposing side (face) of the gel module and a neutral or a slightly anionic plastic film on the other opposing side (face). The inner core of the module consists of an inorganic syneretic gel (e.g., silicic acid, vanadium pentoxide gels etc.).

Dilute potassium hydroxide solutions were used only in the anolyte and catholyte electrode compartments of this electrogel deacidifier. In the prior art, all anion-membrane electrodialysis process, however, dilute potassium hydroxide is used in every alternate cell compartment in order to neutralize the hydrogen ions.

Deacidification of Citrus Juice By Electrogel Process

The net reaction in the juice compartments is the removal of citric acid as a concentrated citric acid-citrate solution of gel exudate. The degree of acid removal was controlled by regulating the applied voltage or current, and the flow rate of the juice feed through the electrogel system.

RUN XI

EXPERIMENTAL DATA

Feed was filtered (no solids) natural grapefruit juice:

| | |
|---|---|
| Feed Temperature | = 88°F. |
| Feed Acidity | = 1.75% |
| Effluent Acidity | = 0.70% |
| Cell Velocity | = 0.15 FT/sec |
| Applied Voltage | = 75 volts |
| Current Density | = 9.5 ma/cm² |
| Current Efficiency | = 50% |
| Exudate | = 6% total citric acid and potassium citrate content solution |

RUN XII

EXPERIMENTAL DATA

Feed (concentrate orange juice) was clarified (suspended solids removed by centrifugation):

| | |
|---|---|
| Feed Temperature | = 100°F. |
| Feed Acidity | = 1.1% |
| Effluent Acidity | = 0.4% |
| Cell Velocity | = 0.10 FT/sec |
| Applied Voltage | = 80 volts |
| Current Density | = 10 ma/cm² |
| Current Efficiency | = 59% |
| Exudate | = 5% total citric acid and potassium citrate solution |

These two runs illustrate the successful application of the electro-gel method in removing excess citric acid and concentrating same from tart orange and grapefruit juices. Throughout our citrus deacidification runs, there was encountered a steady increase in the electrical resistance of the electrogel deacidifier system. This was caused for the most part by colloidal accumulations at the membrane surfaces. This problem was solved by means of periodic current reversal.

New frequent current reversal is urged as a means of operating this process with a minimal increase in cell resistance. Also, it was observed that a somewhat higher operating temperature (above room temperature) around 100°F. gave good current efficiencies of around 60 percent. Current densities in excess of 14 ma/cm² caused degradation in the citrus juice itself.

In Runs XI and XII, the inorganic gel core was silicic acid gel and the cation-permeable membrane was commercially available AMF Co. C-60 membrane, while the anion-permeable membrane was ordinary cellulose film.

RUN XIII (REMOVAL AND CONCENTRATION OF ELECTROLYTES FROM ACID MINE DRAINAGE)

Stream pollution resulting from mining operations is a serious problem in the United States and the world. Annually, approximately 500 billion gallons of mine drainage contain 5 to 10 million tons of acid pollute over 10,000 miles of surface streams and more than 15,000 acres of impounded waters.

The basic problem stems from the formation of sulfuric acid from ferrous sulfide oxidation in waters emanating from both active and abandoned coal mines. The pollution is characterized by low pH, high hardness, and large amounts of ferric salt. The presence of these pollutants renders streams especially deleterious to aquatic life, both animal and plant; corrosive to metallic structures which come into contact; and unattractive from an esthetic viewpoint.

Presently, the chief method of acid mine pollution abatement is neutralization of the water with lime or soda ash and subsequent oxidation of the ferrous to ferric iron followed by flocculation and removal of hydrous oxides of iron, manganese and alluminum.

Our experimental determinations demonstrated that typical acid mine drainage feed samples were desalted and deacidified directly by our electrogel process. The electrogel method continuously produced an overflow acidic concentrate stream of low pH and high salt content.

Membranes used in this acid mine drainage determination were slightly more porous than previous ion-exchange membranes and of the non-polarizing type. The cation-permeable membrane had a moderate cation-transference number between 0.60 and 0.80, and a moderate electroosmotic water transport between 10 and 15 moles per Faraday. The anion-permeable membrane had a slight to moderate anion-transference number between 0.52 –0.72, and a moderate to high electroosmotic water transport between 5.0 and 10.0 moles per Faraday.

The inner core comprising silicic oxide gel was prepared from a 1:3 molar ratio of $H_2SO_4$ to $Na_2SiO_3$.

Another typical run consisted of the treatment of a dilute solution of synthetic acid mine drainage, containing less than 5 ppm iron salts by our electrogel method. An eleven-fold reduction in percent hardness and an increase in pH levels from 3.2 to 4.2 resulted when this synthetic acid mine water comprising 5000 ppm of total calcium, magnesium and manganesium sulfates to which was added concentrated sulfuric acid to pH level of 3.2 was treated by our electrogel cell system operating at a 15–20 ma/cm² current density and a feed flow rate of 0.1 FT/sec.

In this run, our electrogel cell comprised of a cation-permeable membrane of 0.92 cation-transference number and an electroosmotic water transport between 4.0 and 9.0 moles per Faraday; an anion-permeable membrane of 0.75 anion-transference number and an electroosmotic water transport between 4 and 7.0 moles per Faraday. The inner core comprising silicic oxide gel was prepared from a 1:3 molar ratio of $H_2SO_4$ to $Na_2SiO_3$.

Our data showed that our electrogel process removed sulfuric acid, manganese, aluminum, calcium and magnesium salts, and simultaneously concentrated the same into a small volume for disposal. The efficiency Typical Experimental Run Raw Acid Mine Drainage Stream Composition:
Raw Feed: Acid ($H_2SO_4$) level   pH = 3.0
   Manganese and Aluminum sulfates   800 ppm.
   Iron (ferrous) sulfate   125 ppm.

Cell Operating Data

Cell Velocity Feed   0.06 – 1.5 FT/sec
Current Density   10 – 25 ma/cm²
Current Efficiency   42 – 48%

Concentrated acid waste composition (pH = 1.9) comprised sulfuric acid and sulfates of manganesium, aluminum and iron.

Composition of Effluent desalted stream was pH level of 4.4
   Iron Sulfate   = 60 ppm
   Manganesium and Aluminum Sulfate   = 200 ppm
   Other monovalent salts   = 150 ppm of this method depended on the concentration of iron salts which acted as a foulant to our ion-permeable membranes. We found that these iron salts were also removed when we used more porous, less selective ion-permeable membranes in our electrogel method.

RUN XIV (RECOVERY OF CONCENTRATED SULFITES FROM SPENT PULPING LIQUORS BY ELECTROGEL DEMINERALIZATION)

Technical management in pulp mills are very concerned with recovery of pulping inorganic chemicals (basic sulfites) in their pulping process. We have found that when the raw spent sulfite pulping liquors were processed in our Electrogel Demineralizer, we recovered large amounts of sodium, ammonium and magnesium sulfites as a highly concentrated solution. This concentrated sulfite solution may be re-used in the pulp digesters or recovered as valuable useful chemicals.

In comparing the currently-used electrodialysis cell plate and frame design, as described in U.S. Pat. No. 3,136,710; and Canadian Pat. No. 677,654, our electrogel concentration process produced a much higher sulfite concentrate with a simpler, single-pass cell arrangement instead of the more expensive plate and frame construction.

Components of Electrogel Module for These Two Test Runs:

1. A cation-permeable membrane, with a cation-transfer efficiency of 95 percent.
2. A porous anion-permeable membrane, with an anion-transfer efficiency of 65 percent, and a water permeability of less than $10^{-5}$ ml/sec-cm$^2$-psi.
3. The inner gel core was silicic acid gel prepared from $H_2SO_4$: $Na_2SiO_3$ molar of 1:3.

Test Runs

| Feed Treated: Raw Acid Sulfite Spent Pulping Liquor | |
|---|---|
| Feed Volume | 8 gallons |
| Feed Temperature | 65°C. |
| Feed pH | 2.7 |
| Cell Velocity | 0.2 FT/sec |
| Applied Average Cell Voltage | 160 volts |
| Average Current Density | 125 ma/cm$^2$ |
| Current Efficiency | 68% |
| D.C. Energy Consumption | 0.20 KW-HR/GALLON |
| Percent Full Sulfite Recovery = (for reuse) collected as highly concentrated Mg, Na and NH$_4$ basic sulfites solution from sulfite-rich gel overflow stream | 96% |
| Feed Treated: Raw Neutral Sulfite Spent Pulping Liquor | |
| Feed Volume | 6 gallons |
| Feed Temperature | 50°C. |
| Feed pH range | 6.5–8.0 |
| Cell Velocity | 0.2 FT/sec |
| Applied Average Cell Voltage | 170 volts |
| Average Current Density | 120 ma/cm$^2$ |
| Current Efficiency | 65% |
| D. C. Energy Consumption | 0.22 KW-HR/GALLON |
| Percent Full Sulfite Recovery = (for reuse) collected as highly concentrated Mg, Na and NH$_4$ basic sulfites solution from sulfite-rich overflow stream | 95% |

Our experimental results show that sodium sulfite and magnesium sulfite, with small amounts of sodium formate and acetate were recovered and concentrated to near their sulfite saturation level. Operating the electro-gel concentration process at moderately elevated temperatures up to 65°C. resulted in increased ion transfer and sulfite concentrations.

It is well to point out that this advantage is pertinent to the pulping industry. Inasmuch as spent pulping process liquors are released at elevated temperatures being bled from continuous pulp digesters.

RUN XV (REMOVAL AND CONCENTRATION OF ZINC SALTS FROM ACIDIC AQUEOUS ELECTROLYTES)

We prepared a number of acidic zinc solutions comprising 3.0 percent (by weight) of $ZnCl_2$, to which was added concentrated HCl to yield solutions at various acid levels within the pH range 2.5–6.0.

We treated a number of these zinc salt solutions by our electro-gel method, and we measured the zinc chloride depletion in the desalted effluent and the concentration of zinc chloride in the overflow concentrate stream.

A cation-permeable membrane having a cation-transference number higher than 0.90 and an electroosmotic water transport of less than 7.0 moles per Faraday; and an anion-permeable membrane having an anion-transference number higher than 0.85 and an electroosmotic water transport of less than 5.0 moles per Faraday, were employed. The inner gel cores each comprised silicic oxide, individually prepared from a series of 1:1, 1:2 and 1:3 molar ratios of $H_2SO_4$ : $Na_2SiO_3$.

A TYPICAL EXPERIMENTAL RUN

Feed: 5 gallons of 3.0% $ZnCl_2$ solution, pH = 4.0
Overflow concentrate stream: 14.0% $ZnCl_2$ solution, pH = 2.5
Effluent desalted stream: 0.9% $ZnCl_2$ solution, pH = 4.4
Flow Rate: 0.1–0.3 gallons per minute
Temperature: 25°C.
Current Density: 12–20 ma/cm$^2$
Applied Cell Voltage: 95 volts

RUN XVI (REMOVAL AND CONCENTRATION OF ELECTROLYTES FROM AQUEOUS RADIOACTIVE FISSION PRODUCTS BY THE ELECTROGEL PROCESS)

Our Electrogel Process meets two special requirements in treating waters contaminated with radioactivity: first, the radioactive water is desalted to remove most of the radio activity, and second, the salt is concentrated into a small volume of solution as overflow effluent to reduce the cost of final disposal.

(A) Removal and Concentration of Radioactive Strontium Salts

Radioactive Strontium is one of the most biologically hazardous elements of the fission products because of its high retention in the body, and its concentration in the bone. The maximum permissible level for strontium - 90 in water is $8 \times 10^{-7}$ microcuries/ml.

Radioactive tap water [pH = 4.5] containing 500 ppm hardness (Na, Mg and Ca nitrates) and a level of strontium - 90 nitrate of $1.0 \times 10^{-4}$ microcuries/ml is used as the feed. Low flow rates of 0.05–0.40 gallons per minute are used in our method.

The membranes are: a cation-permeable membrane having a cation-transference number higher than 0.92 and an electroosmotic water transport of less than 7.0 moles per Faraday, and an anion-permeable membrane having an anion-transference number higher than 0.86 and an electroosmotic water transport of less than 5.0 moles per Faraday. The inner gel cores individually consist of silicic oxide, each preparable from a series of 1:1, 1:2 and 1:3 molar ratios of $H_2SO_4$ : $Na_2SiO_3$.

A constant decontamination factor of 15 is attainable by our method. The effluent desalted waste stream has a radioactive level below $0.67 \times 10^{-5}$ microcuries/ml. A moderate current density of 5–15 ma/cm$^2$ is used.

(B) Removal and Concentration of Radioactive Cesium Salts

The maximum permissible radioactive level for Cesium - 137 in water is $1.5 \times 10^{-3}$ microcuries/ml. Radioactive tap water (pH = 5.0) containing 150 ppm hardness in calcium salts and 400 ppm sodium and potassium chlorides and a level of Cesium-137 of $8.0 \times 10^{-2}$ microcuries/ml is decontaminated and desalted in our method. Low flow rates of 0.05–0.40 gallons per minute are used.

The membranes are: a cation-permeable membrane having a cation-transference number higher than 0.92 and an electroosmotic water transport of less than 16.5 moles per Faraday; and an anion-permeable membrane having an anion-transference number higher than 0.86 and an electroosmotic water transport of less than 5.0 moles per Faraday. The inner gel core consists of silicic oxide, preparable from 1:2 molar ratio of $H_2SO_4 : Na_2SiO_3$.

A continuous decontamination factor of 20 is maintainable by our method. The effluent desalted waste stream has a radioactive level below $4.0 \times 10^{-3}$ microcuries/ml. A moderate current density 5–15 ma/cm$^2$ is used.

What is claimed is:

1. An apparatus for simultaneously removing and concentrating electrolytes from aqueous solutions containing the same, comprising at least one electrolyte removal and concentrating unit which comprises an inorganic oxide gel core encased within an open module having a bottom wall, a pair of parallel opposing sides and a pair of parallel opposing end walls, said opposing sides further comprising a cation-permeable membrane and an anion-permeable membrane, respectively, and a source of an appliable electrical field.

2. An apparatus according to claim 1 wherein said anion-permeable membrane further comprises a neutral membrane film consisting of cellulose.

3. An apparatus according to claim 1 wherein said inorganic oxide gel core is formed of the oxides of a metal selected from the group consisting of Groups III-A, IV-A, IV-B, V-B, VI-B, VII-B, VIII and rare earths of the Periodic Table.

4. An apparatus according to claim 1 wherein said inorganic oxide gel comprises a plural gel comprising a predominant amount of silica combined with at least one oxide of a metal selected from the group consisting of Groups I-B, II, III, IV, V, VI, VII and VIII of the Periodic Table.

5. An apparatus according to claim 3 wherein said inorganic oxide gel core is formed of silica.

6. An apparatus according to claim 1 wherein said module is inclined longitudinally at a slope from the normal.

7. An apparatus according to claim 1 wherein said module is inclined transversely at a slope from the normal.

* * * * *